United States Patent
Angel et al.

(10) Patent No.: US 10,800,029 B1
(45) Date of Patent: Oct. 13, 2020

(54) PROTECTIVE IMPROVISED CAP STICK

(71) Applicant: The United States of America as Represented by the Secretary of the Navy, Indian Head, MD (US)

(72) Inventors: Diaz Angel, Indian Head, MD (US); Keith Chamberlain, Waldorf, MD (US); Daniel McCarthy, LaPlata, MD (US); Lee Foltz, Indian Head, MD (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/501,760

(22) Filed: Jun. 6, 2019

(51) Int. Cl.
*B25J 1/04* (2006.01)

(52) U.S. Cl.
CPC ........................ *B25J 1/04* (2013.01)

(58) Field of Classification Search
CPC ....... B25J 1/04; B25J 1/02; E01H 2001/1233; E01H 2001/1293; A47F 13/06
See application file for complete search history.

(56) References Cited

U.S. PATENT DOCUMENTS

| | | | | |
|---|---|---|---|---|
| 2,575,638 A * | 11/1951 | Price | ...................... | A01D 11/00 294/50.9 |
| 3,139,299 A * | 6/1964 | Bowen | .................. | E01H 1/1206 294/1.4 |
| 3,425,734 A * | 2/1969 | Hollis | ...................... | A45B 3/00 294/104 |
| 4,441,746 A | 4/1984 | Corboy, Jr. | | |
| 4,669,769 A | 6/1987 | Polder, Jr. | | |
| 5,503,442 A * | 4/1996 | Lee | ...................... | E01H 1/1206 294/1.4 |
| 5,941,586 A | 8/1999 | Fann | | |
| 6,508,496 B1 | 1/2003 | Huang | | |
| 6,848,731 B2 | 2/2005 | Khubani et al. | | |
| 7,004,520 B2 | 2/2006 | Khubani et al. | | |
| 7,665,782 B2 | 2/2010 | Buzby et al. | | |
| 7,677,619 B2 | 3/2010 | Hutchings et al. | | |
| 7,695,035 B2 * | 4/2010 | Sumner | ................ | A01K 27/004 294/1.4 |
| 8,231,159 B2 * | 7/2012 | Raihala | .................. | E02F 3/4135 294/106 |
| 9,238,302 B2 | 1/2016 | Thibodeaux et al. | | |
| 9,290,905 B1 | 3/2016 | Diaz et al. | | |
| 2007/0046049 A1 | 3/2007 | Gale et al. | | |
| 2013/0033053 A1 | 2/2013 | Wilkinson et al. | | |

* cited by examiner

*Primary Examiner* — Stephen A Vu
(74) *Attorney, Agent, or Firm* — Fredric J. Zimmerman

(57) ABSTRACT

An exemplary apparatus includes a reach-extender shaft having a first end and a second end. A jaw assembly may be attached to the first end of the reach-extender shaft. The jaw assembly may be angularly displaced from the first end of the reach-extender shaft and may include a pair of jaws having a stationary jaw and a moveable jaw pivotably attached to the stationary jaw. A handle assembly may be attached to the second end of the reach-extender shaft. The handle assembly includes a grip with a trigger and a shield. The trigger is pivotably attached to the grip and operatively attached to the jaw assembly by an actuator rod coupled between the trigger and the moveable jaw. The shield is located between the jaw assembly and the trigger, in a plane angled across the longitudinal axis of the reach-extender shaft.

17 Claims, 7 Drawing Sheets

PROTECTIVE IMPROVISED CAP STICK

ORIGIN OF THE INVENTION

The invention described herein was made in the performance of official duties by employees of the Department of the Navy and may be manufactured, used, licensed by or for the Government for any governmental purpose without payment of any royalties thereon.

BACKGROUND

Field of the Invention

The present disclosure relates generally to hand operated portable devices for grasping and manipulation of objects, and more particularly to mechanical grabbers for handling suspect or explosive devices.

Description of the Background

Bomb disposal is an extremely difficult and dangerous profession. Bomb technicians, also known as Explosive Ordnance Disposal (EOD) personnel (operators), are constantly exposed to explosive devices of varying power and sophistication. Explosive devices that bomb technicians routinely address may include traditional explosives as well as chemical or biological devices. Because of the clear and inherent danger in bomb disposal, various forms of protection and methods of handling explosive devices have been implemented to increase the safety and survival rate of a bomb technician in the event of inadvertent device detonation.

Bomb technicians respond to and exploit improvised explosive devices or energetic threats including primary energetic items, such as blasting caps. Many explosive devices are located where it is difficult or impossible for remotely controlled vehicles to enter or navigate. In such cases, a bomb technician may be required to handle, personally, and transport an explosive device. Their work is typically hands-on, without necessarily being fully aware of the condition of the threat. EOD personnel need the ability to move or manipulate improvised explosive devices and blasting caps that are unstable or in an unknown condition, from a safe distance. The bomb technician typically will wear a protective bomb disposal suit to protect the bomb technician in the event of device detonation. While these suits offer an operator some degree of protection, there are historical incidents of severe injury to EOD personnel due to improvised blasting caps unintentionally detonating while handling.

In addition, EOD personnel typically are required to carry the necessary EOD tools on their person for a long distance. This requirement may arise because the EOD work area is not easily accessible to vehicles or the vehicles are not available or for other reasons. In any event, the EOD tools and equipment must be small in size (or easily disassembled into a small size) and small in weight to enable carriage by an EOD operator.

Current methods used to grip, transport, and place improvised energetic blasting caps can require hands-on, manual manipulation. Due to the nature of various, extremely sensitive explosive fills, improvised caps can inadvertently detonate causing personal injury or death to the operator. Due to the size and construction of such blasting caps, commercial, hand-operated trash/object pick-up tools lack the ability to safely and confidently grip, transport, and place detonators.

SUMMARY

Various embodiments herein concern a modular device that can be used to remotely grip, transport, and place improvised detonators manually at a standoff distance for the purpose of limiting the risk of injury or death to the operator in the event the blasting cap inadvertently detonates. An exemplary Protective Improvised Cap (PIC) stick may be made of minimalized, 3D-printed plastic parts with a carbon fiber I-beam core to enable an operator to manually interrogate a blasting cap at a safe, standoff distance. The components of such an exemplary device may include a gripper having an upper jaw and a lower jaw. The gripper may have a pivot interface to the I-beam. A rigid actuator rod may be coupled together to form various lengths to connect to a trigger housed in a protective pistol grip. The upper and lower jaws may be angularly displaced from the I-beam to avoid direct transmission of an inadvertent blast directly through the I-beam. The user can extend the I-beam toward the object of interest and have direct tactile control to open/close the jaws of the gripper through the rigid actuator rod in order to maintain constant force on items in the gripper. In some embodiments, at least one of the upper jaw or lower jaw has a wide, shovel-like grasping surface. Additionally, in some embodiments, only one jaw, opposing the jaw having the wide, shovel-like grasping surface, may be movable with sufficient rigidness to provide positive control in grasping an explosive device into the wide grasping surface. A protective shield may be provided between the jaw assembly and the trigger.

According to an aspect of the invention, a reaching apparatus includes a reach-extender shaft having a first end and a second end. A pair of jaws may be attached to the first end of the reach-extender shaft. The pair of jaws may include a stationary jaw and a moveable jaw. The pair of jaws may be angularly displaced from the reach-extender shaft. A handle assembly may be attached to the second end of the reach-extender shaft. The handle assembly may include a trigger operatively attached to the moveable jaw and a shield. The shield may be located in a plane that is angled across the longitudinal axis of the reach-extender shaft.

According to an exemplary gripper herein, a jaw assembly may be attached to a first end of a reach-extender shaft. The jaw assembly may be angularly displaced from the reach-extender shaft and include a pair of jaws having a stationary jaw and a moveable jaw pivotably attached to the stationary jaw. A handle assembly may be attached to a second end of the reach-extender shaft. The handle assembly may include a trigger and a shield. The shield may be located in a plane that is angled across the longitudinal axis of the reach-extender shaft. An actuator rod may be coupled between the trigger and the moveable jaw.

According to an exemplary apparatus herein, the apparatus includes a reach-extender shaft having a first end and a second end. A jaw assembly may be attached to the first end of the reach-extender shaft. The jaw assembly may be angularly displaced from the first end of the reach-extender shaft and include a pair of jaws having a stationary jaw and a moveable jaw pivotably attached to the stationary jaw. A handle assembly may be attached to the second end of the reach-extender shaft. The handle assembly may include a grip with a trigger and a shield. The trigger may be pivotably attached to the grip and operatively attached to the jaw assembly by an actuator rod coupled between the trigger and the moveable jaw. The shield may be located between the jaw assembly and the trigger, in a plane that is angled across the longitudinal axis of the reach-extender shaft.

DETAILED DESCRIPTION OF THE INVENTION

In general, a Protective Improvised Cap (PIC) stick may be made of minimalized, 3D-printed plastic parts with a carbon fiber I-beam core to enable an operator to manually interrogate a blasting cap at a safe, standoff distance. The components of such an exemplary device may include an upper jaw and a lower jaw, having a pivot interface to the I-beam. A rigid actuator rod may be coupled together to form various lengths to connect to a trigger housed in a protective pistol grip. The upper and lower jaws may be angularly displaced from the I-beam to avoid direct transmission of an inadvertent blast directly through the I-beam. The user can extend the I-beam shaft to the object of interest and have direct tactile control to open/close the jaw grippers through the rigid actuator rod in order to maintain constant force on items in the gripper. In some embodiments, at least one of the upper jaw or lower jaw has a wide, shovel-like grasping surface. Additionally, in some embodiments, only one jaw, the one jaw opposing the jaw having the wide, shovel-like grasping surface, may be movable with sufficient rigidness to provide positive control in grasping an explosive device into the wide grasping surface.

Figure 1:
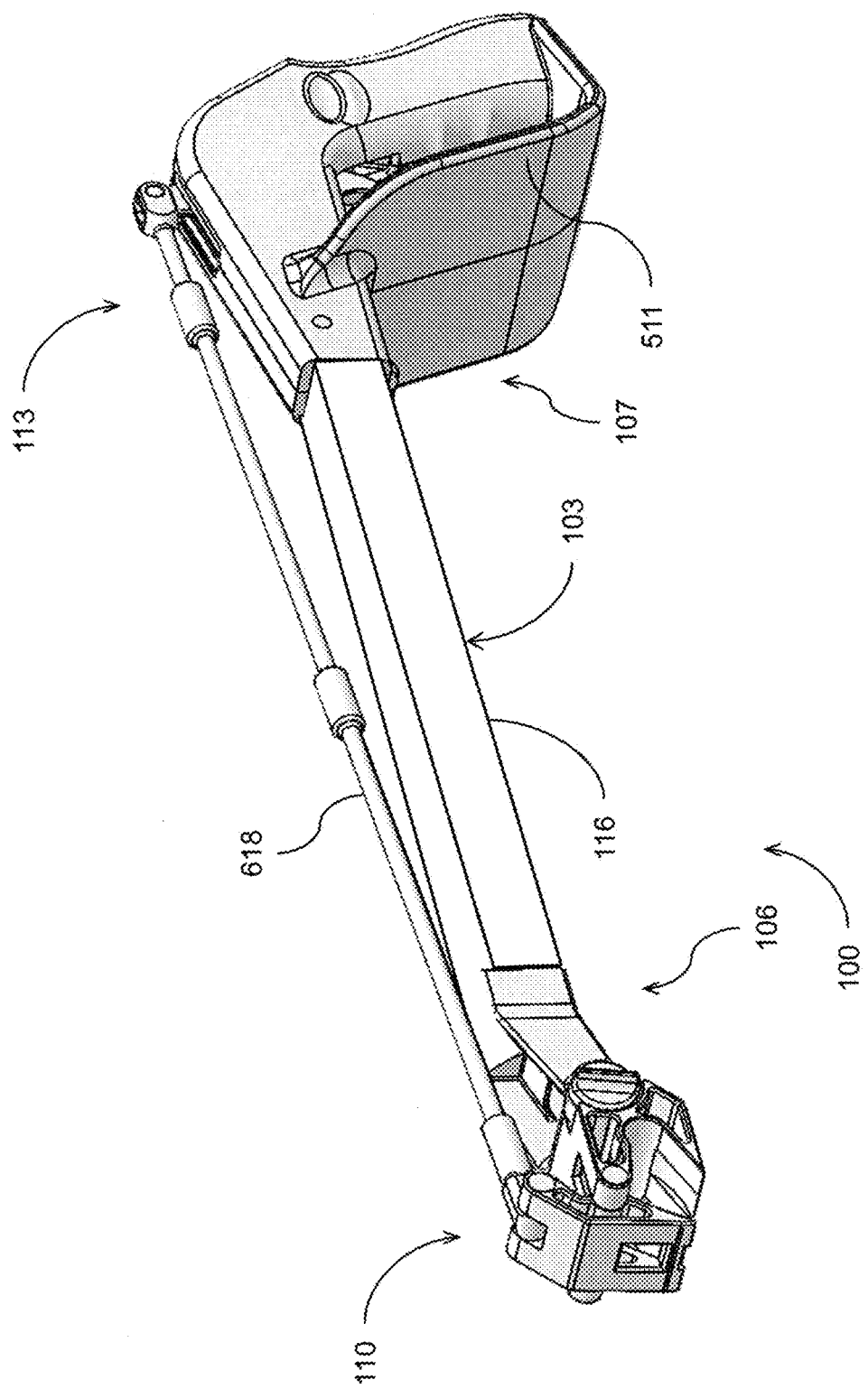
FIG. 1 is a perspective view of a mechanical gripper according to devices herein.

Referring now to the drawings, FIG. 1 shows a mechanical gripper, indicated generally as 100, according to devices herein. The mechanical gripper 100 may include a reach-extender shaft 103 having a first end 106 and a second end 107. A jaw assembly 110 may be attached to the first end 106 of the reach-extender shaft 103. A handle assembly 113 may be attached to the second end 107 of the reach-extender shaft 103. The reach-extender shaft 103 may be made of a carbon fiber or other appropriate material. In some cases, the reach-extender shaft 103 may be 3-D printed from plastic. A reach-extender shaft 103 made of carbon fiber may provide the least amount of material as possible for a given length, bending stiffness, and tensile strength based on size and density/mass. In addition, carbon fiber provides high sound speed in the material (42,000 ft/s), which allows the user to feel an object of interest more quickly and with less force than some other types of materials, such as aluminum or steel (20,000 ft/s), wood (13,000 ft/s), etc. Using appropriate materials, such as carbon fiber, the reach-extender shaft 103 may be made more than 2-feet long and weigh less than 1-pound.

Figure 2B:
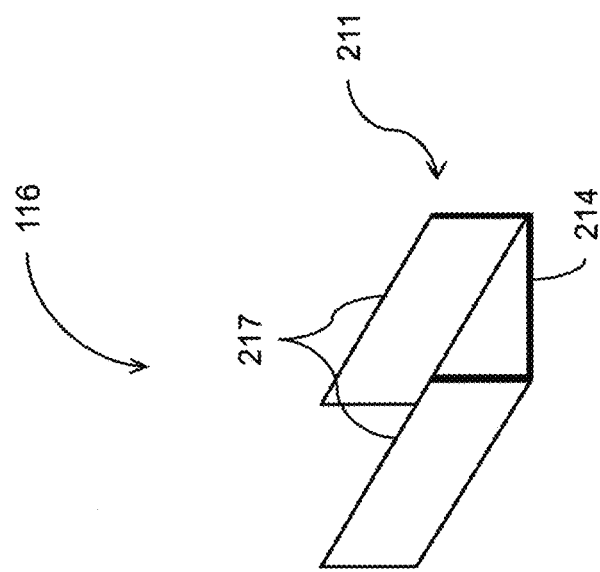
FIG. 2B is a cross-section view of an exemplary U-channel shaped reach-extender shaft for a mechanical gripper according to devices herein.
Figure 2A:
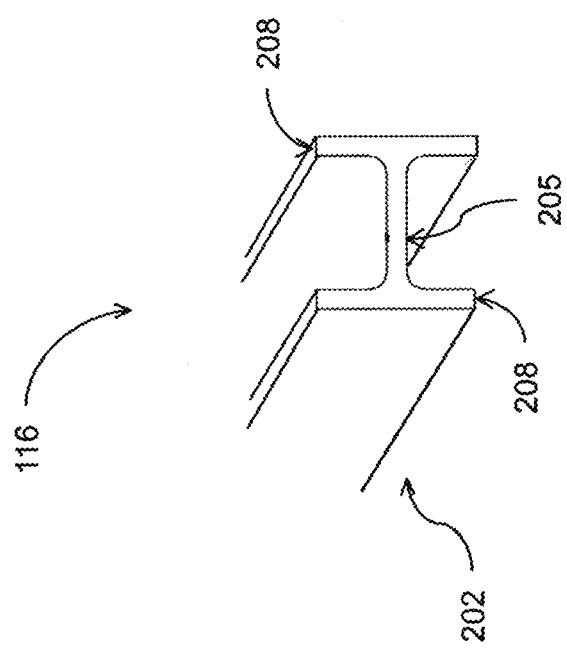
FIG. 2A is a cross-section view of an exemplary I-beam shaped reach-extender shaft for a mechanical gripper according to devices herein.

In some embodiments, the reach-extender shaft 103 may include a core 116 shaped as an I-beam 202, as shown in FIG. 2A. As would be known by one of ordinary skill in the art, an I-beam 202 is an elongate support structure, with an I or H-shaped cross-section, as shown in FIG. 2A. The central element is known as the "web" 205, while the vertical elements that extend outwardly from the web 205 are known as flanges 208. The web 205 resists shear forces, while the flanges 208 resist most of the bending moment experienced by the I-beam 202. In general, the I or H-shaped cross-section is a very efficient form for carrying both bending and shear loads in the plane of the web 205. In some exemplary embodiments, the reach-extender shaft 103 may include a core 116 shaped as a U-channel 211, as shown in FIG. 2B. A U-channel is generally a structural track with a U-shaped cross-section, such as shown in FIG. 2B. The U-channel may have a flat bottom 214 and two vertical flanges 217 sticking out from one side of the flat bottom 214. The reach-extender shaft 103 may be made to any desired length in order to provide sufficient safe, standoff distance from a blasting cap or other object of interest to be interrogated.

Figure 3:
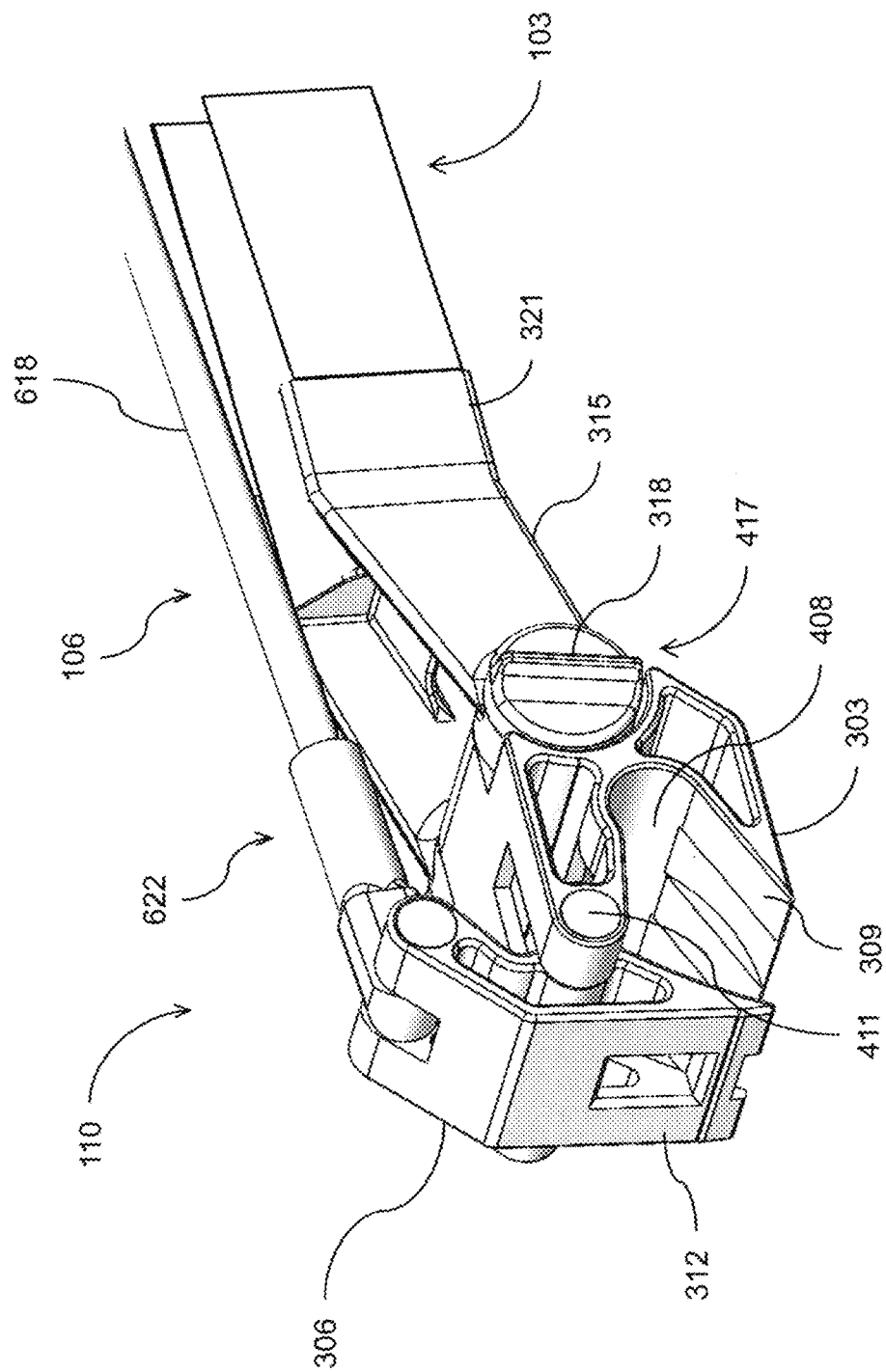
FIG. 3 is a perspective view of a jaw assembly for a mechanical gripper according to devices herein.
Figure 4A:
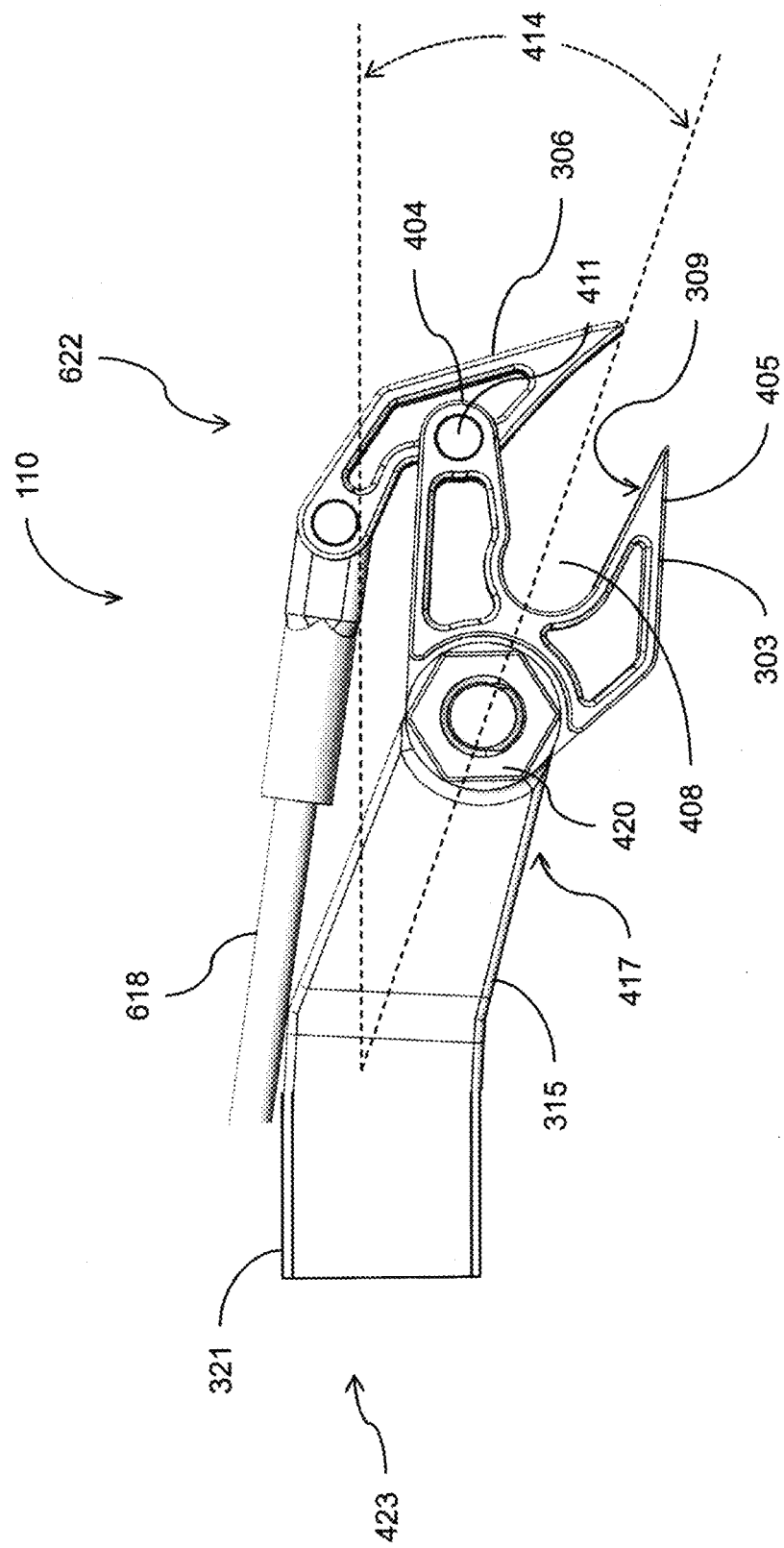
FIG. 4A is side view of the jaw assembly of FIG. 3 in an open position, according to devices herein.
Figure 4B:
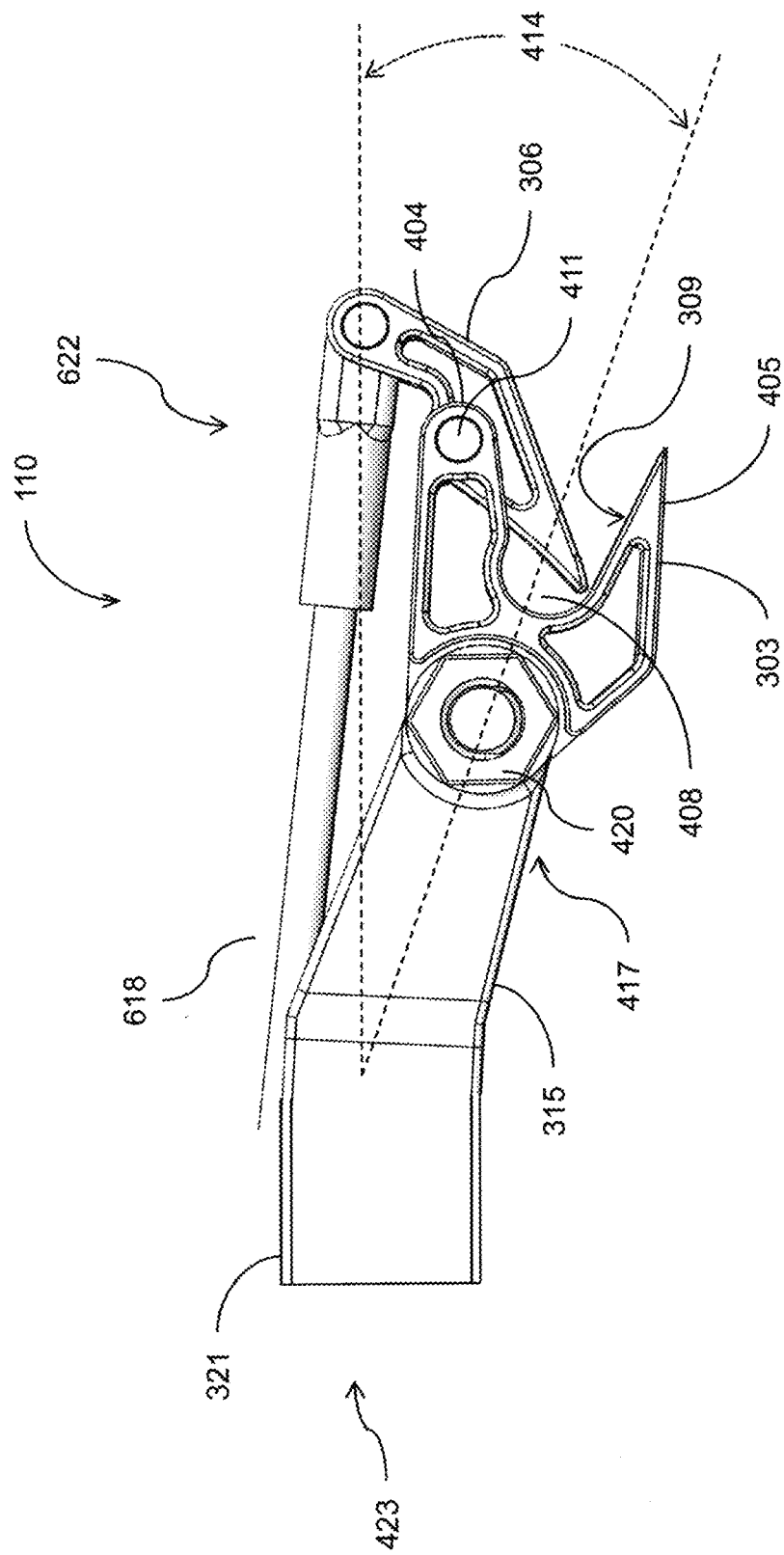
FIG. 4B is side view of the jaw assembly of FIG. 3 in a closed position, according to devices herein.

Referring to FIGS. 3 and 4A and 4B, the jaw assembly 110 may be attached to the first end 106 of the reach-extender shaft 103. The jaw assembly 110 may include a pair of jaws having a lower jaw 303 and an upper jaw 306. In some exemplary embodiments, the lower jaw 303 may be stationary in relation to the reach-extender shaft 103, while the upper jaw 306 may be moveable in relation to the lower jaw 303. The lower jaw 303 may be substantially C-shaped in cross section, as shown in FIGS. 4A and 4B, having a first extension piece 404 and a second extension piece 405. The first extension piece 404 and second extension piece 405 define a concave space or holding area 408 formed between the upper jaw 306 and the lower jaw 303 by the first extension piece 404 and the second extension piece 405. The first extension piece 404 may include a pivot point 411 at the distal end of the first extension piece 404 so that the upper jaw 306 may be pivotably attached to the lower jaw 303. In some exemplary embodiments, the second extension piece 405 of the lower jaw 303 may consist of a blade 309, best seen in FIG. 3. The blade 309 may be wide and flat to function as a shovel designed to scoop up an object of interest into the holding area 408. In some embodiments, the upper jaw 306 may consist of a paddle 312 designed to pull an object of interest into the holding area 408. The holding area may be provided so that the jaw assembly 110 does not squeeze or apply pressure directly to an object of interest, such as a suspected explosive device.

The jaw assembly 110 may include a neck 315 formed at an angle 414 between the reach-extender shaft 103 and the lower jaw 303, such that the lower jaw 303 is out of line from the reach-extender shaft 103, as shown in FIGS. 4A and 4B. The angle 414 may be between approximately 30° and approximately 45° below the longitudinal axis of the reach-extender shaft 103. Other angles may be used, as appropriate. In this manner, the holding area 408 is displaced below the reach-extender shaft 103, so that an object of interest, such as a suspected explosive device sequestered in the holding area 408, upon inadvertent explosion, avoids focusing the blast force directly along the longitudinal axis of the reach-extender shaft 103.

In some exemplary embodiments, the lower jaw 303 may be pivotably attached to one end of the neck 315 using a locking device 417. The locking device 417 allows the angle of the lower jaw 303 to be advantageously adjusted to a desired angle to facilitate handling and transport of an object of interest, such as a suspected explosive device. The locking device 417 may include a knob 318 connected by a shaft to a threaded nut 420, which allows an operator to lock the lower jaw 303 at a desired angle by tightening the knob 318. Adjusting the angle of the lower jaw 303 may further avoid focusing the blast force of an inadvertent explosion directly along the longitudinal axis of the reach-extender shaft 103 and increases the survivability of the bomb technician by further removing the technician from the blast radius of a suspected explosive device.

The opposite end of the neck 315 may include a first connector 321 having an aperture 423 sized and configured to receive and hold the first end 106 of the reach-extender shaft 103. The reach-extender shaft 103 may be pressed into the first connector 321, snap-fit into the first connector 321, or attached by other methods, as would be known by one of ordinary skill in the art.

The geometry of the jaw assembly 110 is designed to pick up, lift, and transport a primary energetic object approximately the size and shape of a pen. The components of the jaw assembly 110 may be constructed of lightweight plastic or other appropriate material. In some embodiments, the components of the jaw assembly 110 may be made using a 3-D printer and assembled in a modular fashion.

Figure 5:
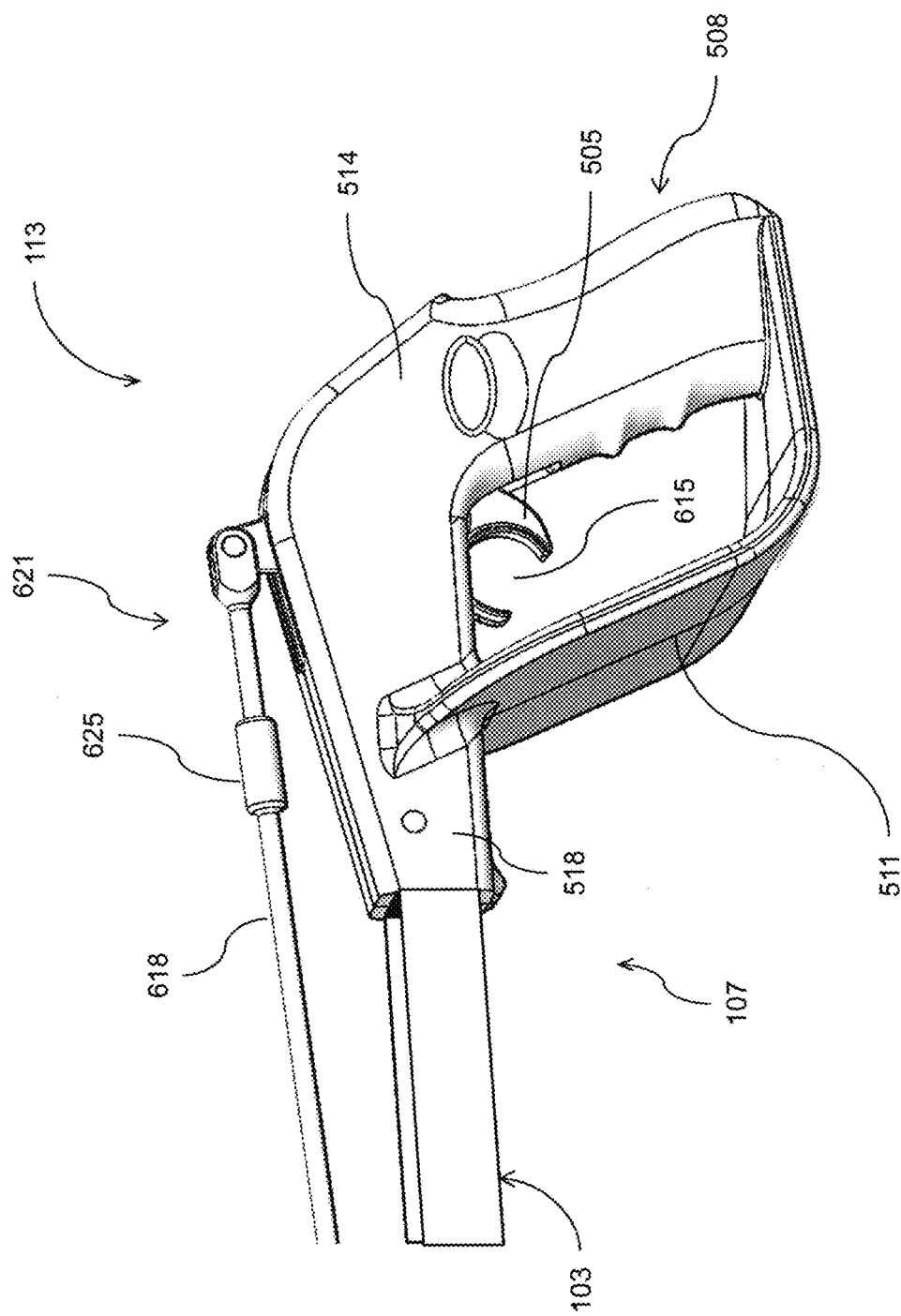
FIG. 5 is side view of a handle assembly for a mechanical gripper according to devices herein.
Figure 6:
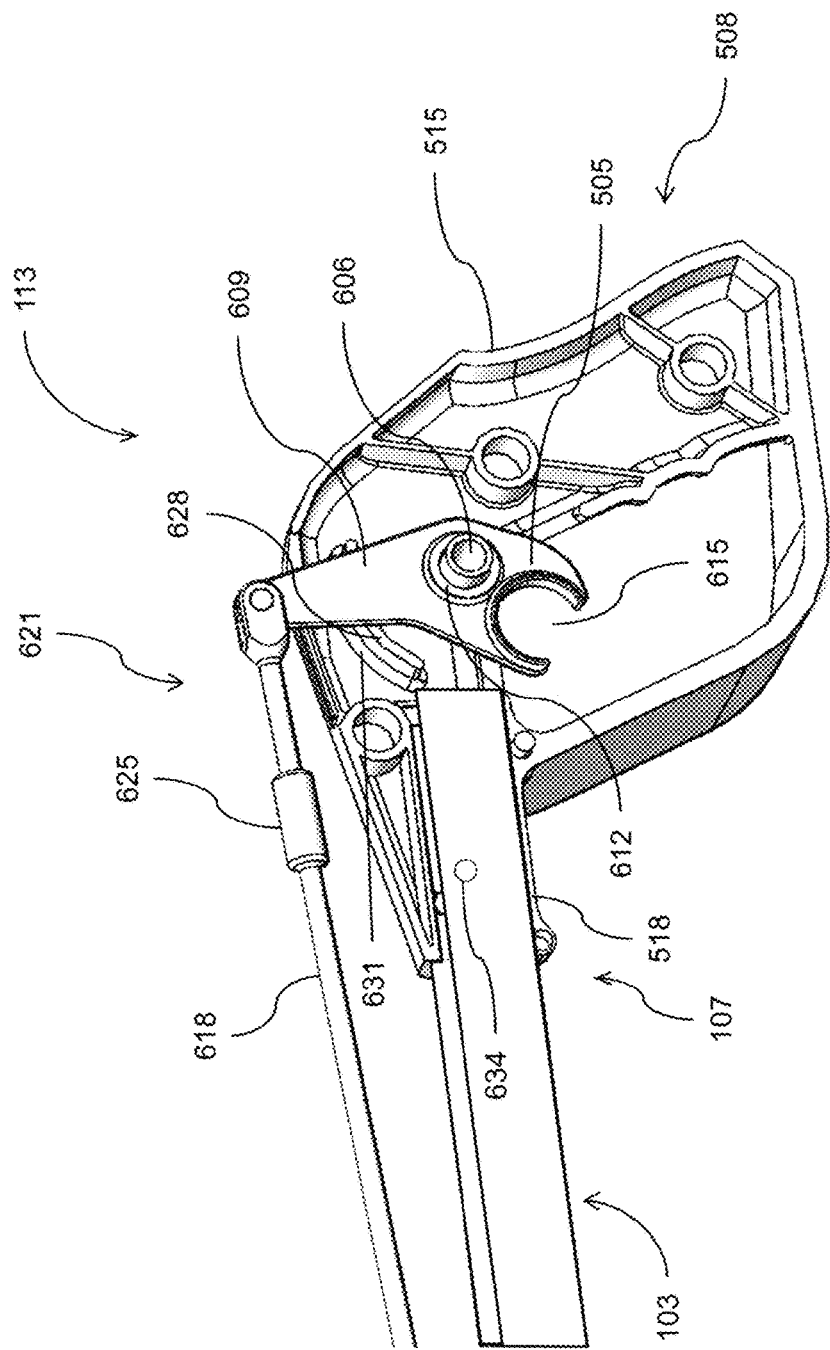
FIG. 6 is a cutaway view of the handle assembly of FIG. 5, according to devices herein.

Referring now to FIGS. 5 and 6, the handle assembly 113 may be attached to the second end 107 of the reach-extender shaft 103. The handle assembly 113 may include a trigger 505 and a grip 508. The trigger 505 may be operatively attached to the upper jaw 306, as described in more detail below. The grip 508 may be any type of grip, such as a pistol grip or the like. The handle assembly 113 may also include a shield 511 designed to protect the hand of an operator upon inadvertent explosion of an object of interest, such as a blasting cap or suspected explosive device. The shield 511 may be a substantially flat plate located between the jaw assembly 110 and the trigger 505, in a plane that is angled across the longitudinal axis of the reach-extender shaft 103. While, in some cases, the plane of the shield 511 may be orthogonal to the longitudinal axis of the reach-extender shaft 103, it may be formed at any angle between about 45° and 90°.

The grip 508 is arranged within the handle assembly 113 to receive a hand of a user. The grip 508 may be formed of two mirrored pieces 514, 515 that are fitted together. Mirrored pieces 514, 515 may be molded or constructed of lightweight plastic or other appropriate material. In some embodiments, the mirrored pieces 514, 515 may be made using a 3-D printer and assembled in a modular fashion. The mirrored pieces 514, 515 cooperate to form the grip 508. The shield 511 may be assembled of two pieces integrally formed as portions of the mirrored pieces 514, 515. The grip 508 may also include raised ridges and depressions for finger placement. It will also be appreciated that the sides of the grip 508 may include ridges, indentations, and other shapes to produce an ergonomic feel.

As shown in FIG. 6, the grip 508 may include an axle 606 and a component arm 609 rotatably connected to the axle 606 so that the component arm 609 may rotate about the axle 606. The component arm 609 may include a bushing 612 around the axle 606. One end of the component arm 609, which may be designated the trigger 505, may include a finger slot 615. The finger slot 615 may be sized and configured to fit a finger of an operator, such as an index finger. The opposite end of the component arm 609 is pivotably connected to an actuator rod 618 coupled between the component arm 609 and the upper jaw 306, such that movement of the trigger 505 causes movement of the upper jaw 306 between an open position, as shown in FIG. 4A and a closed position, as shown in FIG. 4B. For example, movement of the trigger 505 in a trajectory away from the grip 508 may cause the upper jaw 306 to move in an opening direction and movement of the trigger 505 in a trajectory toward the grip 508 may cause the upper jaw 306 to move in a closing direction.

The actuator rod 618 may be an elongated, rigid member having a first end 621 and a second end 622. In some exemplary embodiments, the actuator rod 618 may be made of several pieces connected together to form various lengths of the actuator rod 618. Threaded couplings, such as 625, may be used to connect pieces of various length to form the actuator rod 618. In some embodiments, the threaded couplings 625 may be used to adjust the length of the actuator rod 618. The first end 621 of the actuator rod 618 may be pivotably connected to the component arm 609, as shown in FIG. 6, and the second end 622 of the actuator rod 618 may be pivotably connected to the upper jaw 306, as shown in FIG. 4.

The length of the lever arm associated with pivot point 411 in the jaw assembly 110 (that is, the distance from the pivot point 411 to the connection point of the upper jaw 306 to the second end 622 of the actuator rod 618) and the length of the lever arm associated with the axle 606 in the handle assembly 113 (that is, the distance from the axle 606 to the connection point of the component arm 609 to the first end 621 of the actuator rod 618) may cooperate such that the upper jaw 306 may move over a greater distance than that moved by the trigger 505.

In some embodiments, a ridge 628 may be provided adjacent to the component arm 609 to afford stability for the trigger 505. In some embodiments, a slot 631 may be provided adjacent to the ridge 628 to guide movement of the trigger 505. The actuator rod 618 enables positive control of opening and closing of the upper jaw 306 by movement of the trigger 505.

The front of the handle assembly 113 may have a second connector 518 formed in the mirrored pieces 514, 515. The second connector 518 may be sized and configured to receive and hold the second end 107 of the reach-extender shaft 103. The reach-extender shaft 103 may be pressed into the second connector 518, snap-fit into the second connector 518, or attached by other methods, as would be known by one of ordinary skill in the art. For example, a pin 634 may be mated with a hole in the reach-extender shaft 103 to hold the second end 107 of the reach-extender shaft 103 in the handle assembly 113.

The components of the handle assembly 113 may be constructed of lightweight plastic or other appropriate material. In some embodiments, the components of the handle assembly 113 may be made using a 3-D printer and assembled in a modular fashion.

The invention has been described with references to specific exemplary embodiments. While particular values, relationships, materials, and steps have been set forth for purposes of describing concepts of the invention, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present invention, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises", "comprising", "includes", and/or "including", when used in this specification, specify the presence of stated features, integers, steps, operations, elements, and/or components, but do not preclude the presence or addition of one or more other features, integers, steps, operations, elements, components, and/or groups thereof. Further, the terms "automated" or "automatically" mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For example, terms such as "right", "left", "vertical", "horizontal", "top", "bottom", "upper", "lower", "under", "below", "underlying", "over", "overlying", "parallel", "perpendicular", etc., as used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A reaching apparatus, comprising:
   a reach-extender shaft including a first end and a second end;
   a pair of jaws being attached to the first end of said reach-extender shaft, wherein said pair of jaws is comprised of a lower jaw and an upper jaw,
      wherein said pair of jaws is angularly displaced from said reach-extender shaft;
   a handle assembly being attached to the second end of said reach-extender shaft, wherein said handle assembly comprise a trigger operatively attached to said upper jaw a shield,
      wherein said shield comprises a plate located in a plane that is angled across a longitudinal axis of the reach-extender shaft; and
      an actuator rod being coupled between said trigger and said upper jaw.

2. The reaching apparatus according to claim 1, wherein said upper jaw is a moveable jaw and said lower jaw is a stationary jaw, and wherein said moveable jaw is pivotably attached to said stationary jaw.

3. The reaching apparatus according to claim 1, wherein said upper jaw is vertically displaced above said lower jaw.

4. The reaching apparatus according to claim 3, wherein said upper jaw comprises a paddle and said lower jaw comprises a shovel, and wherein said upper jaw comprises said moveable jaw and said lower jaw comprises said stationary jaw.

5. The reaching apparatus according to claim 3, further comprising a holding space between the upper jaw and the lower jaw, wherein said upper jaw comprises a paddle and said lower jaw comprises a shovel, and wherein said upper jaw comprises said moveable jaw and said lower jaw comprises said stationary jaw.

6. The reaching apparatus according to claim 1, said handle assembly further comprising a grip, wherein said trigger is rotatably connected to said grip, and wherein said shield is integrally formed with said grip.

7. The reaching apparatus according to claim 1, wherein said shield is located between said pair of jaws and said trigger.

8. A gripper, comprising:
   a jaw assembly being attached to a first end of a reach-extender shaft, said jaw assembly is angularly displaced from said reach-extender shaft, and said jaw assembly comprises a pair of jaws, which comprises a stationary jaw and a moveable jaw pivotably attached to said stationary jaw;
   a handle assembly being attached to a second end of said reach-extender shaft, wherein said handle assembly comprises a trigger, and a shield,
   wherein said shield comprises a plate located in a plane that is angled across a longitudinal axis of the reach-extender shaft; and
   an actuator rod being coupled between said trigger and said moveable jaw, wherein said shield is located between said jaw assembly and said trigger.

9. The gripper according to claim 8, wherein said moveable jaw is vertically displaced above said stationary jaw.

10. The gripper according to claim 9, wherein said moveable jaw comprises a paddle and said stationary jaw comprises a shovel.

11. The gripper according to claim 8, further comprising a holding space between the moveable jaw and the stationary jaw, wherein said moveable jaw comprises an upper jaw in relation to said stationary jaw, which is a lower jaw.

12. The gripper according to claim 8, wherein said handle assembly further comprises a grip, wherein said trigger is rotatably connected to said grip, and wherein said shield is integrally formed with said grip.

13. An apparatus, comprising:
- a reach-extender shaft comprising a first end and a second end;
- a jaw assembly being attached to the first end of said reach-extender shaft, wherein said jaw assembly is angularly displaced from said first end of said reach-extender shaft, wherein said jaw assembly comprises a pair of jaws, and wherein the pair of jaws comprises a lower jaw and an upper jaw pivotably attached to the lower jaw;
- a handle assembly being attached to the second end of said reach-extender shaft,
- wherein said handle assembly comprises a grip, a trigger pivotably attached to said grip, and a shield,
- wherein said shield comprises a plate located in a plane that is angled across a longitudinal axis of the reach-extender shaft, and
- wherein said shield is situated between said jaw assembly and said trigger; and
- an actuator rod being coupled between said trigger and said jaw assembly,
- wherein said trigger is operatively attached to said upper jaw, and
- wherein said actuator rod comprises a plurality of pieces connected together to form various lengths of the actuator rod.

14. The apparatus according to claim 13, wherein said upper jaw is vertically displaced above said lower jaw.

15. The apparatus according to claim 14, wherein said upper jaw comprises a paddle and said lower jaw comprises a shovel, and wherein said upper jaw comprises said moveable jaw and said lower jaw comprises said stationary jaw.

16. The apparatus according to claim 14, further comprising a holding space between the upper jaw and the lower jaw, wherein said upper jaw comprises a paddle and said lower jaw comprises a shovel, and wherein said upper jaw comprises said moveable jaw and said lower jaw comprises said stationary jaw.

17. The apparatus according to claim 13, wherein said shield is integrally formed with said grip.

* * * * *